US007746506B2

(12) United States Patent
Arquilevich et al.

(10) Patent No.: US 7,746,506 B2
(45) Date of Patent: Jun. 29, 2010

(54) IMAGE PRODUCTION USING ENHANCED EYE-MARKS

(75) Inventors: Dan Arquilevich, Portland, OR (US); Chris Stoumbos, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1434 days.

(21) Appl. No.: 11/021,437

(22) Filed: Dec. 22, 2004

(65) Prior Publication Data

US 2005/0225804 A1 Oct. 13, 2005

Related U.S. Application Data

(60) Provisional application No. 60/560,679, filed on Apr. 8, 2004.

(51) Int. Cl.
*H04N 1/40* (2006.01)
*G06K 15/00* (2006.01)

(52) U.S. Cl. .................................... 358/3.28; 358/1.18

(58) Field of Classification Search .................. 358/1.2, 358/1.9, 3.28, 402, 1.15; 382/100
See application file for complete search history.

(56) References Cited

U.S. PATENT DOCUMENTS

| | | | | |
|---|---|---|---|---|
| 5,340,262 | A * | 8/1994 | Tsujimoto et al. | 414/273 |
| 5,388,387 | A * | 2/1995 | McElvy | 53/451 |
| RE35,067 | E * | 10/1995 | Bauknecht | 493/11 |
| 6,624,903 | B1 * | 9/2003 | Miquel et al. | 358/1.12 |
| 6,952,994 | B2 * | 10/2005 | Dunn et al. | 101/483 |
| 7,181,451 | B2 * | 2/2007 | Dehlinger et al. | 707/6 |
| 7,225,738 | B2 * | 6/2007 | Underwood et al. | 101/484 |
| 2002/0097407 | A1 * | 7/2002 | Ryan et al. | 358/1.1 |
| 2004/0080772 | A1 * | 4/2004 | Snyders | 358/1.14 |

* cited by examiner

*Primary Examiner*—Gabriel I Garcia

(57) ABSTRACT

An image production method and system in which enhanced eye-marks are utilized. A method embodiment includes receiving image production instructions directing the production of an image. Enhanced eye-mark data is generated for an enhanced eye-mark having an instructive portion and a descriptive portion. An image forming device is caused to form the image and the enhanced eye-mark on print media.

18 Claims, 8 Drawing Sheets

118

STATUS TABLE 120 (rows); 122, 124, 126, 128, 130 (columns)

| JOB ID | PRINTER | FINISHER (ONE) | FINISHER (TWO) | • • • | FINISHER (n) |
|---|---|---|---|---|---|
| (1) | S(1,P) | S(1,F1) | S(1,F2) | • • • | S(1,Fn) |
| (2) | S(2,P) | S(2,F1) | S(2,F2) | • • • | S(2,Fn) |
| • • • | • • • | • • • | • • • | • • • | • • • |
| (M) | S(M,P) | S(M,F1) | S(M,F2) | • • • | S(M,Fn) |

FIG. 13

132

STATUS INTERFACE 134 (rows); 136, 138, 140, 142, 144 (columns)

| JOB ID | PRINTER | FINISHER (ONE) | FINISHER (TWO) | • • • | FINISHER (n) |
|---|---|---|---|---|---|
| (1) | COMPLETE 5 of 5 | COMPLETE 5 of 5 | COMPLETE 5 of 5 | • • • | PROGRESS 4 of 5 |
| (2) | COMPLETE 7 of 7 | ERROR 6 of 7 | PROGRESS 6 of 7 | • • • | WAITING |
| • • • | • • • | • • • | • • • | • • • | • • • |
| (M) | PROGRESS 1 of 10 | WAITING | WAITING | • • • | WAITING |

FIG. 14

IMAGE PRODUCTION USING ENHANCED EYE-MARKS

CROSS REFERENCE TO RELATED APPLICATION

This application claims priority of provisional application No. 60/560,679 filed Apr. 8, 2004.

BACKGROUND

In a publishing environment, it is often desirable to form images on print media (such as a web or sheets of paper) and to then perform a finishing operation on that print media. Examples of finishing operations include cutting, folding, binding, and laminating. For example, a series of photographic images may be printed on a web and then each of the printed images cut from the web, stacked, and delivered to a customer.

To assist in automating such an image production process, eye-marks are formed next to images on print media. The eye-marks encode instructions that direct the performance of a finishing operation. When the print media is fed through a finishing device such as a cutter, the eye-marks are electronically read and the instructions they encode carried out.

FIG. 1 illustrates an example in which a series of images 10-14 are printed on web 16. Next to each image 10-14 is an eye-mark 18-22. In this example, eye-marks 18-22 each encode instructions indicating where web 16 is to be cut. When web 16 is fed through a cutting device, an optical scanner senses and reads each eye-mark. A processor controlling the operation of the cutting device deciphers the instructions encoded in each eye-mark and guides the operation of the cutting device accordingly.

It is not uncommon for a finishing device to malfunction. Using the example of FIG. 1, as web 16 is being fed through a cutting device, the device might malfunction as it is making a cut following the instructions encoded in eye-mark 20. In addition to remedying the malfunction, a machine operator may also need to record information about the affected region of web 16 in case any images 10, 12, or 14 need to be reprinted. Unfortunately, eye-marks 18-22 provide little assistance to the machine operator.

DESCRIPTION OF THE DRAWINGS

FIG. 13 illustrates an exemplary status table according to an embodiment of the present invention.

FIG. 14 illustrates an exemplary status user interface in which status updates have been received and processed according to an embodiment of the present invention.

DETAILED DESCRIPTION

INTRODUCTION: An eye-mark is a symbol capable of encoding instructions. When the eye-mark is read by an optical scanner, the encoded instructions can be deciphered and acted upon. Eye-marks encoding finishing instructions are useful in the automation of image production. The encoded instructions can be used to guide the operation of a finishing device such as a device capable of cutting, binding, or folding print media.

To print a set of images, a print job is sent to an image forming device such as a laser printer. A print job is an electronic instruction set for printing one or more images. A print job may also include finishing instructions. A printed image may be graphical, textual, or both. For example, the text printed on a sheet of paper is an image. Each picture printed on a web is also an image. As such, one print job might direct the production of a single or multiple page document, while another print job might direct the production of a set of pictures on a web or other print media. To complete the production of a printed set of images, one or more finishing operations may be performed on the print media on which the images have been formed. For example, printed pictures may be cut from a web and a multiple page document may be bound.

ENHANCED EYE-MARKS: Various embodiment of the present invention are directed to generating and utilizing enhanced eye-marks to help automate image production. An enhanced eye-mark is an eye-mark having at least two portions—a machine readable instructive portion and a descriptive portion. The instructive portion, for example, may encode finishing instructions related to a particular image. The descriptive portion, for example, may, in some manner, identify a print job that guided the production of the particular image and/or it may provide an explanation of the instructive portion. The descriptive portion may be in human readable and/or machine readable form.

Figure 1:
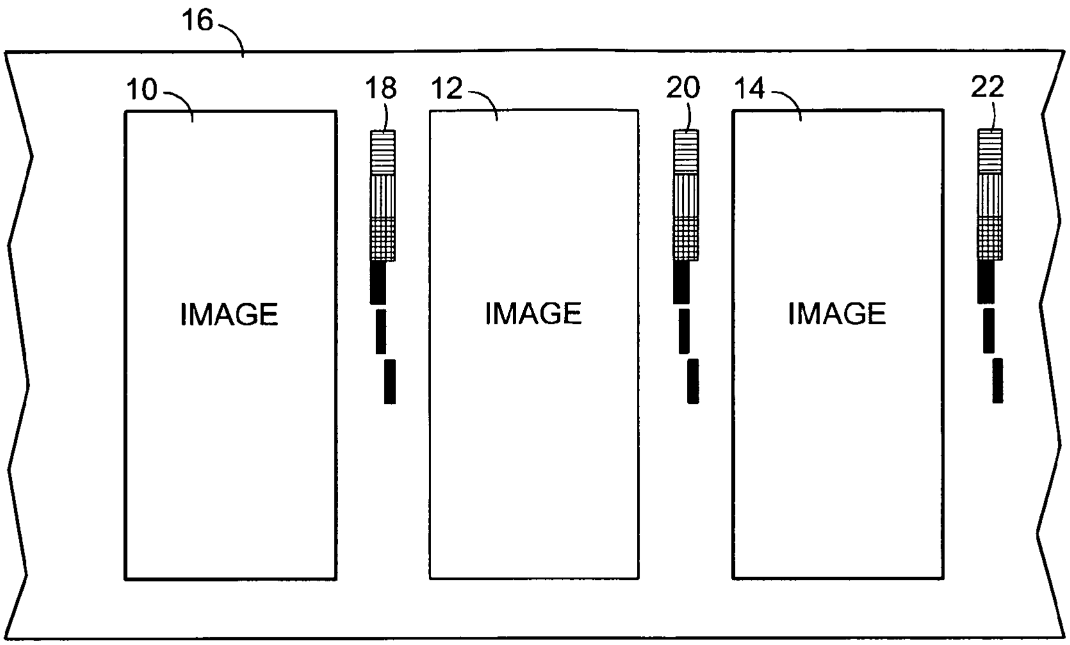
FIG. 1 illustrates a portion of a web on which a number of images and eye-marks have been printed.
Figure 2:
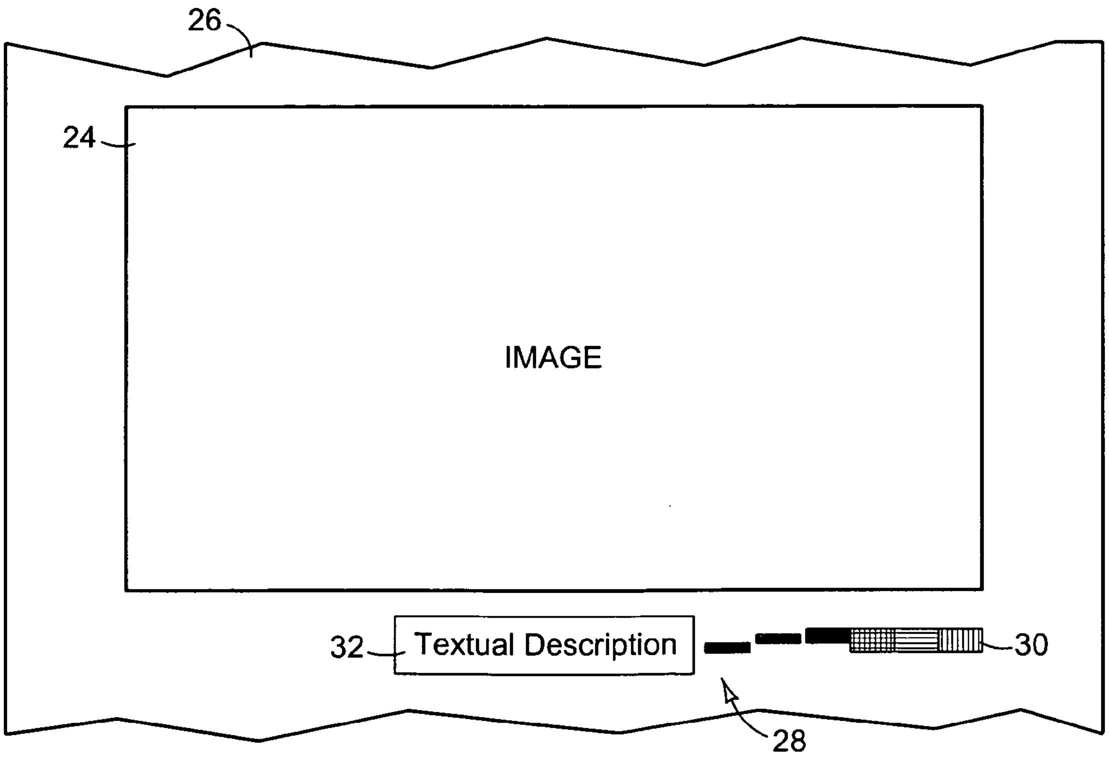
FIGS. 2-4 each illustrate a portion of a web or other print media on which an image and an enhanced eye-mark are printed according to various embodiments of the present invention.
Figure 3:
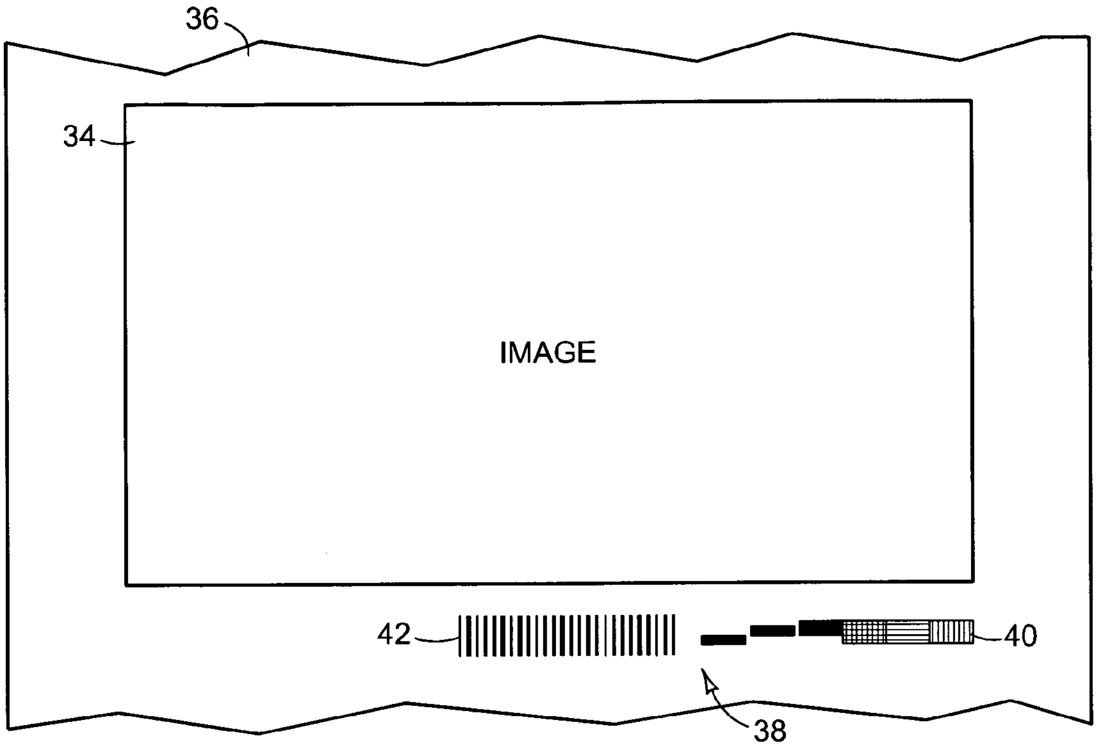
Figure 4:
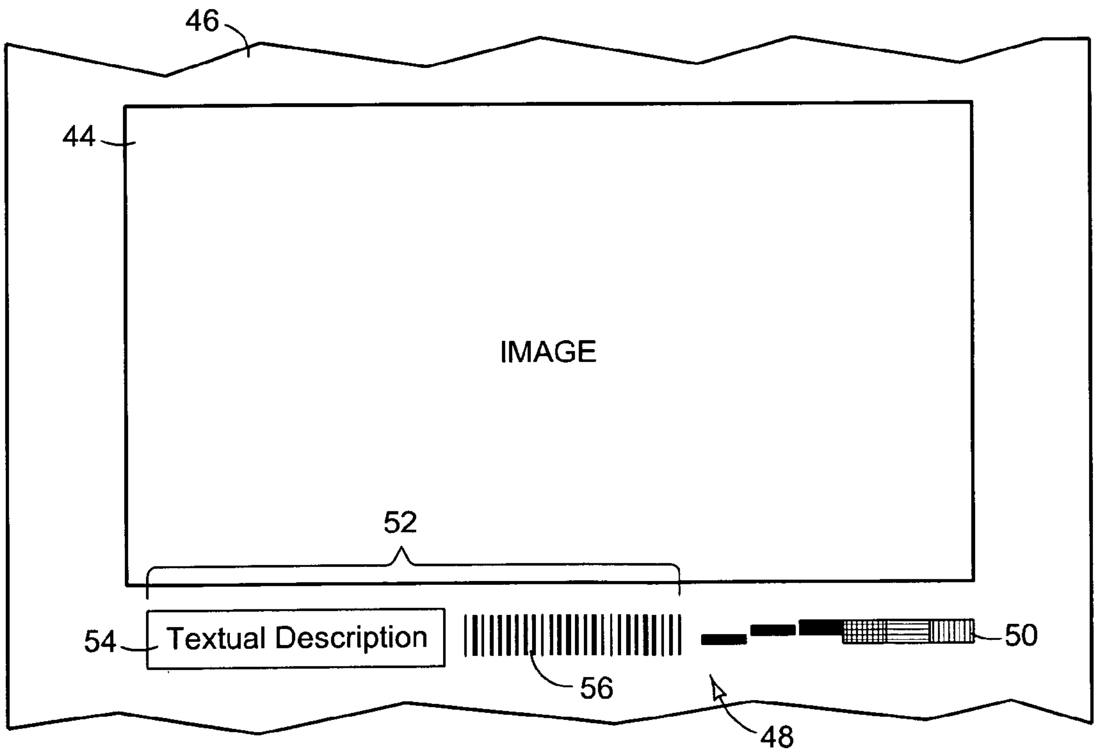

FIGS. 2-4 illustrate examples of enhanced eye-marks. Starting with FIG. 2, an image 24 has been formed on print media 26. Enhanced eye-mark 28 has been formed on print media 26 adjacent to image 24. Enhanced eye-mark 28 includes instructive portion 30 and descriptive portion 32. Instructive portion 30 is a series of visual symbols that encode finishing instructions related to image 24 and print media 26. Descriptive portion 32 provides a textual description. That description may explain the finishing instructions or in some manner identify a print job that guided the formation of image 24. For example, instructive portion 30 may encode instructions specifying that print media 26 is to be cut and the location of the cut. Descriptive portion 32 may textually describe those finishing instructions. As used here, a textual description can include alphanumeric characters and/or other human discernable icons.

Referring now to FIG. 3, image 34 has been formed on print media 36. Enhanced eye-mark 38 has been formed adjacent to image 34 on print media 36. Enhanced eye-mark 38 includes instructive portion 40 and descriptive portion 42. Instructive portion 40 is a series of visual symbols that encode finishing instructions related to image 34 and print media 36. Descriptive portion 42 is a symbol encoding or otherwise associated with data that in some manner encodes a characteristic of a print job that guided the formation of image 34. For example, descriptive portion 42 might identify the print job, identify a batch of print jobs, identify a user responsible for the print job, or any other identifying characteristic. As shown, descriptive portion 42 is a bar code. As print media 36 passes through a finishing device, the bar code can be scanned, the print job identified, and the job's status updated.

Moving to FIG. 4, image 44 has been formed on print media 46. Enhanced eye-mark 48 has been formed adjacent to image 44 on print media 46. Enhanced eye-mark 48 includes instructive portion 50 and descriptive portion 52. Instructive portion 50 is a series of visual symbols that encode finishing instructions related to image 44 and print media 46. Descriptive portion 52 includes two sections—a textual description 54 and an identifying code 56. Textual description 54, for example, may describe finishing instructions encoded by instructive portion 50, it may identify a print job that guided the formation of image 44 on print media 46, or both. Identifying code 56 encodes or is otherwise associated with data that in some manner identifies the print job that guided the formation of image 44. As shown, identifying code 56 is a bar code. As print media 46 passes through a finishing device, the bar code can be scanned, the print job identified, and the job's status updated.

Figure 5:
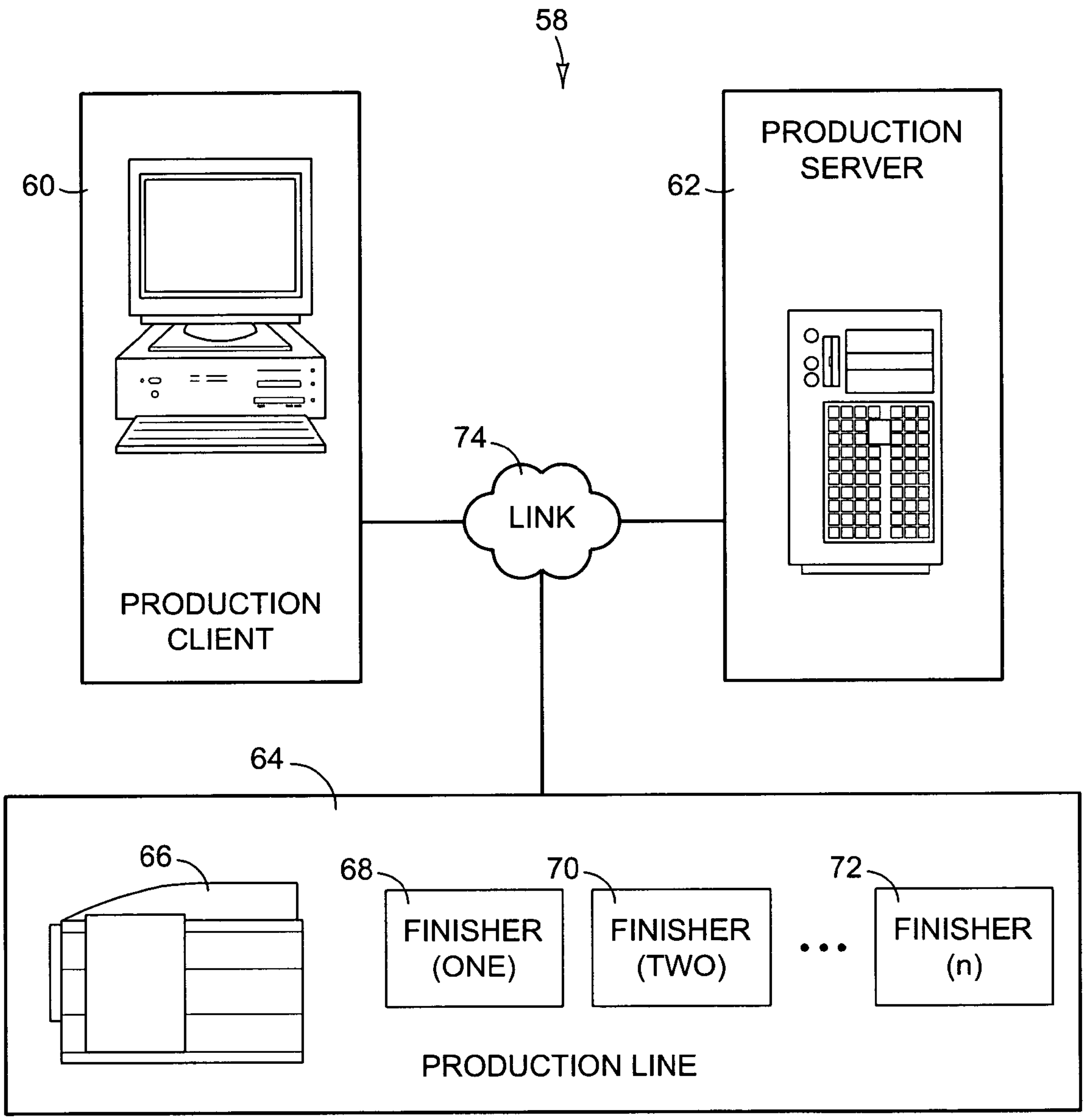
FIG. 5 is a schematic diagram illustrating an exemplary image production environment in which various embodiments of the present invention may be implemented.

Environment: FIG. 5 illustrates an exemplary environment 58 in which various embodiments of the present invention can be implemented. Environment 58 includes production client 60, production server 62, and production line 64. Production client 60 represents generally any combination of hardware and/or programs capable of generating and sending a print job to production server 62. Production server 62 represents generally any combination of hardware and/or programs capable of managing the release of print jobs to production line 64.

Production line 64 represents generally any combination of hardware and programs capable of forming an image on print media and performing one or more finishing operations on the print media. As shown, production line 64 includes image forming device 66, and a series of finishers 68-72. Image forming device 66 represents generally any device capable of forming an image on print media according to a print job released by production server 62. Examples include laser printers, ink jet printers, and commercial printing presses. Finishers 68-72 represent generally any devices capable of performing finishing operations on print media. While shown as separate from image forming device 66, one or more of finishers 68-72 may be integrated with image forming device 66.

Link 74 represents generally a cable, wireless, or remote connection via a telecommunication link, an infrared link, a radio frequency link, or any other connector or system of connectors that provide electronic communication between production client 60, production server 62, and the various components of production line 64. Link 74 may include an intranet, the Internet, or a combination of both.

Components: FIGS. 6-10 are exemplary block diagrams showing the physical and logical components of various implementations of the present invention within environment 58 (FIG. 5). Starting with FIG. 6, production client 60 includes application 76 and driver 78. Application 76 represents generally any program or combination of programs capable of issuing printing instructions. For example, application 76 might be a word processor, image editor, or any other desktop publishing application. Driver 78, in general, is a program responsible for translating generic printing instructions received from application 76 into device specific instructions—a print job—capable of being processed by one or more components of production line 64.

Production server 62 includes queue 80 and queue manager 82. Queue 80 represents an electronic holding bin capable of containing pending print jobs directed to production line 64. Where multiple print jobs are simultaneously directed to production line 64, it may be desirable, to temporarily store each successive print job in queue 80, releasing the print jobs one at a time as production line 64 becomes available. Queue manager 82 represents generally any program or combination of programs capable of managing print jobs within queue 80. More particularly, queue manager 82 is responsible for receiving print jobs from driver 78 and placing those print jobs in queue 80. As production line 64 becomes available, queue manager 82 is responsible for releasing print jobs from queue 80. Queue manager 82 may also be responsible for monitoring the status of print jobs released to production line 64. An exemplary status update table and corresponding user interface for updating print job status is discussed below with reference to FIGS. 13 and 14.

Figure 6:
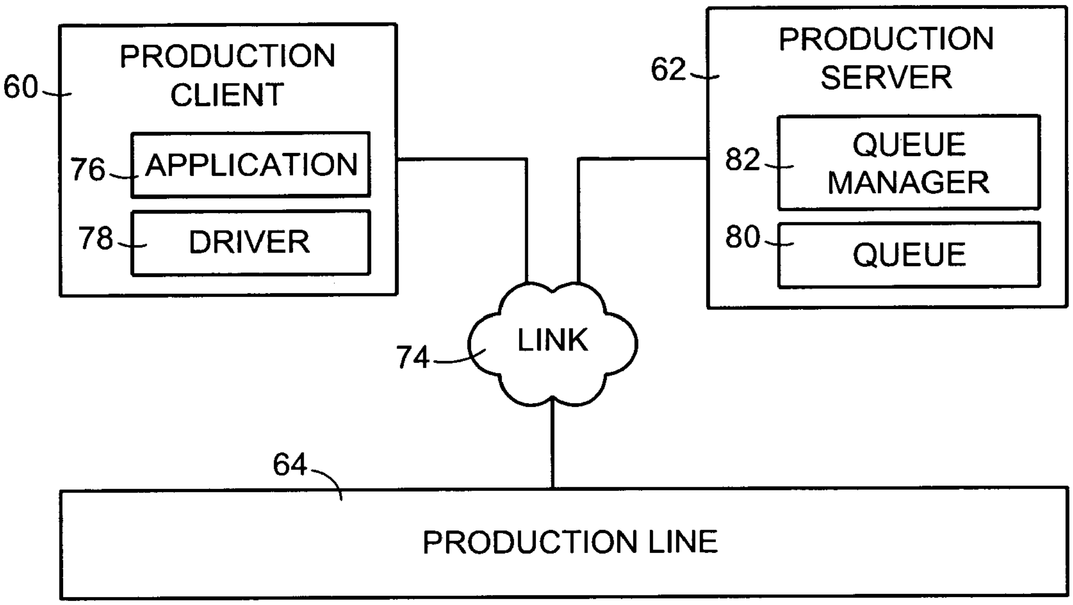
FIG. 6-10 are diagrams showing program elements that can be used to implement various embodiments of the present invention
Figure 7:
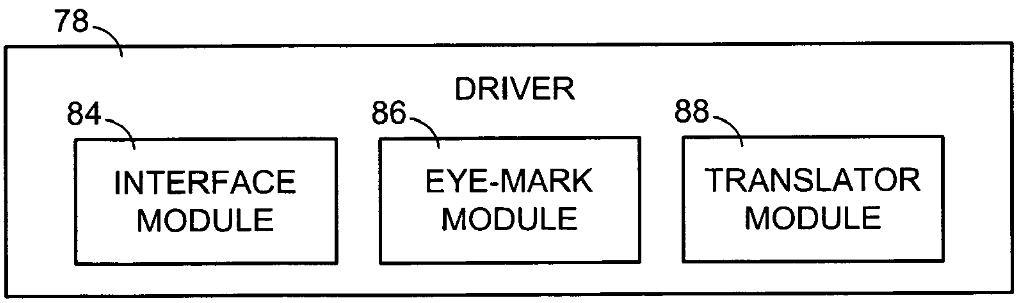

FIG. 7 is an exemplary block diagram expanding on driver 78. As shown, driver 78 includes interface module 84, eye-mark module 86, and translator module 88. Each module 84-88 represents a program or programs capable of performing the following tasks. With reference back to FIG. 6, interface module 84 is responsible for receiving printing instructions from application 76, providing an interface having user accessible controls for selecting finishing options, and delivering a print job to queue 80 and queue manager 82.

Eye-mark module 86 is responsible for generating enhanced eye-mark data according to printing instructions received by interface module 84 and/or selected or default finishing options. Enhanced eye-mark data is an electronic representation of one or more enhanced eye-marks. Printing instructions received by interface module 84 may include instructions to produce a set of images. Enhanced eye-mark data may then include, for each image, an electronic representation of an enhanced eye-mark corresponding to that image.

Translator module 88 is responsible for converting printing instructions, selected finishing options, and enhanced eye-mark data into a print job for production line 64. A print job, for example, may include instructions to produce one or more images with an enhanced eye-mark corresponding to each image.

Figure 8:
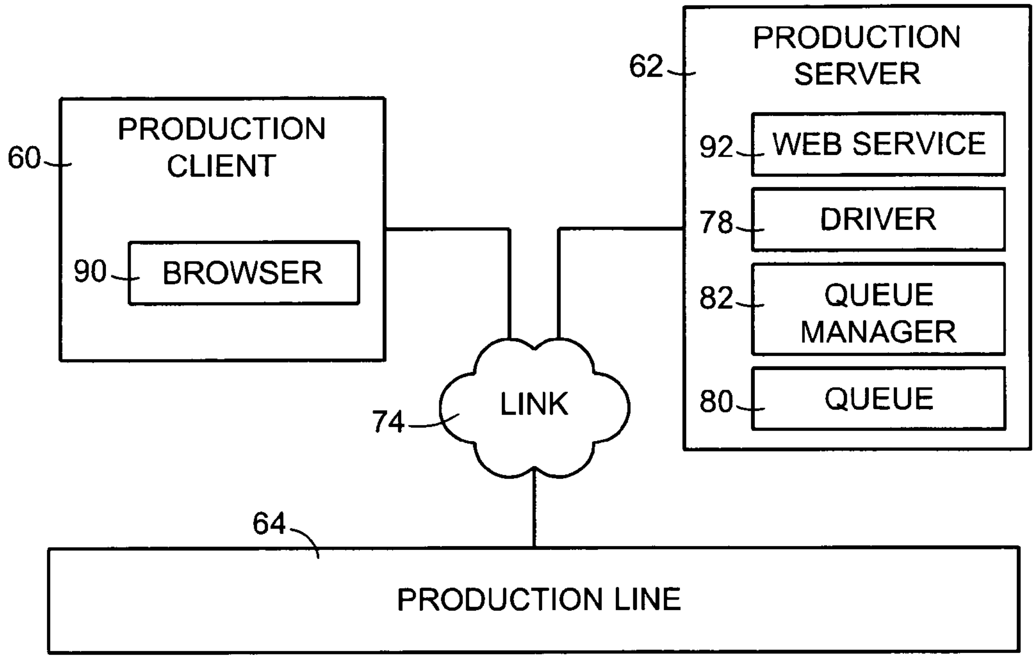

Referring now to FIG. 8, production client 60 includes browser 90 while production server 62 includes web service 92, driver 78, queue 80 and queue manager 82. Browser 90 represents generally any program or combination of programs capable of providing an interface that allows a user to make requests of and receive responses from web service 92. Web service 92 represents generally any program or combination of programs capable of issuing printing instructions at the direction of browser 90. For example, web service 92 might supply browser 90 with a web page having user accessible controls for selecting printing options. Browser 90 returns user selected options to web service 92 which in turn sends corresponding printing instructions on to driver 78.

Figure 9:
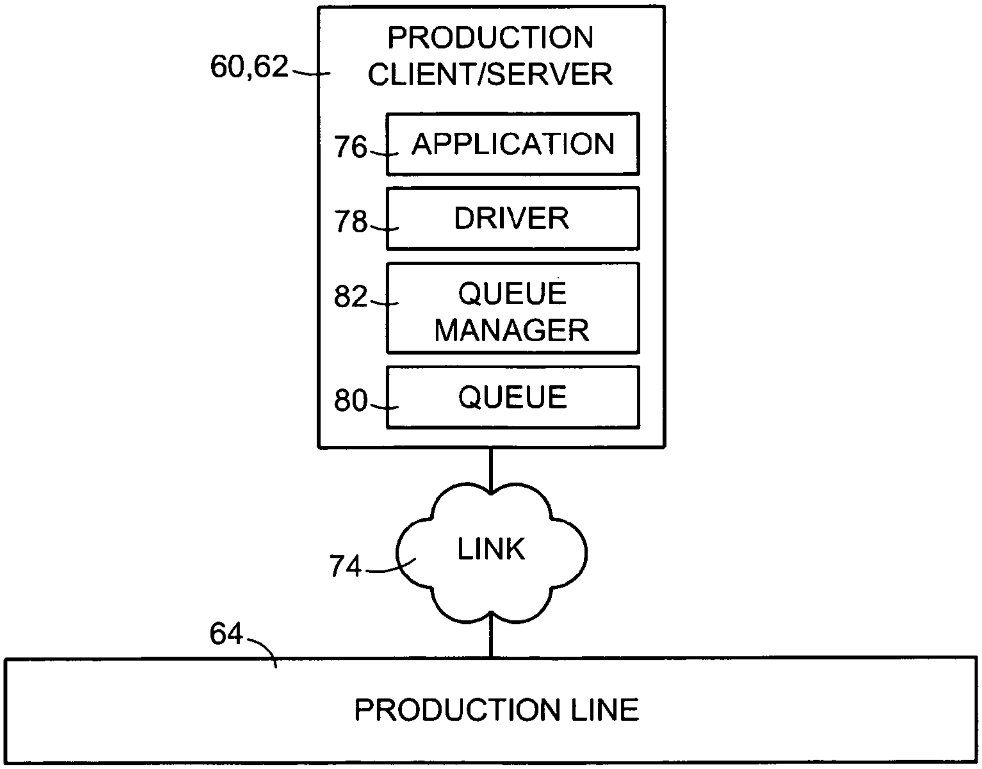
Figure 10:
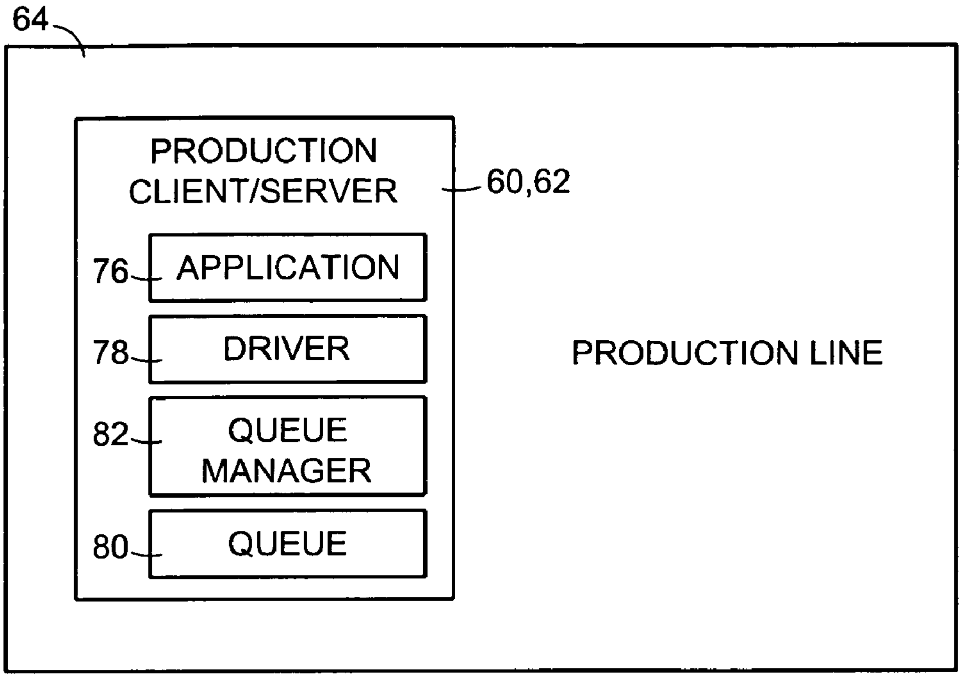

Referring to FIG. 9, production client 60 and production server 62 are shown as a single device. Production client/server 60,62 includes application 76, driver 78, queue 80 and queue manager 82. In FIG. 10, production client/server 60/62 is shown as an integral part of production line 64. In such an implementation, production client/server 60,62 might be an integral portion of an image forming device such as image forming device 66 shown in FIG. 5.

Figure 11:
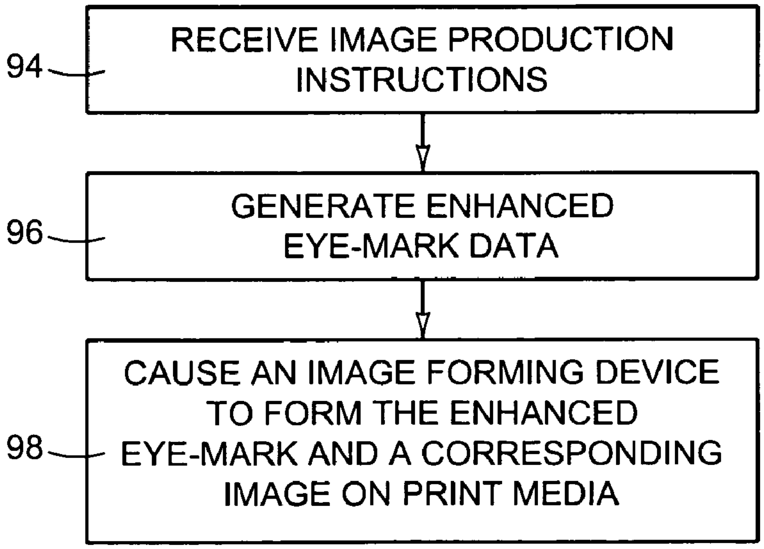
FIG. 11 is an exemplary flow diagram illustrating steps taken to produce an image and corresponding enhanced eye-mark according to an embodiment of the present invention.
Figure 12:
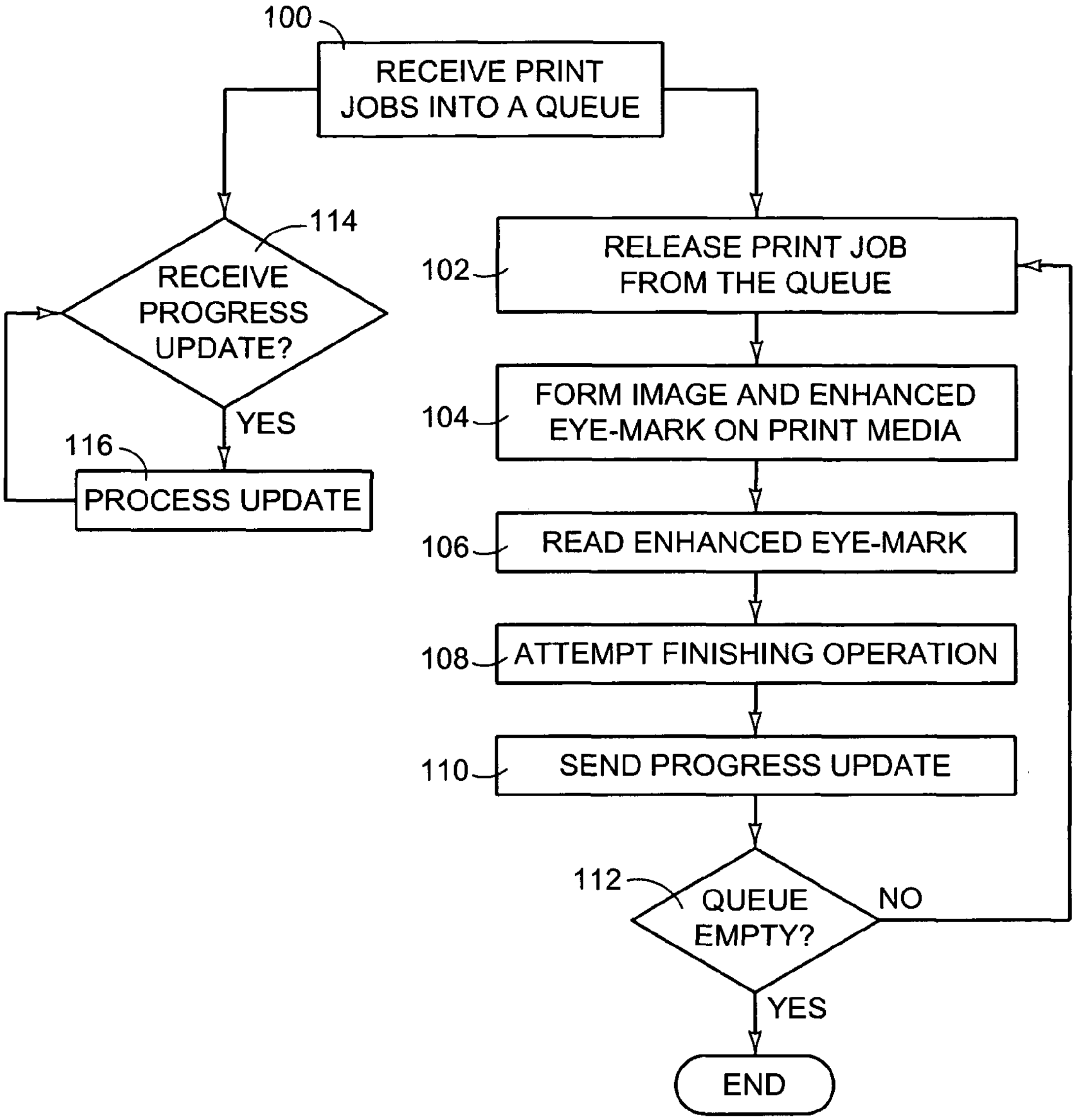
FIG. 12 is an exemplary flow diagram illustrating steps taken to monitor the progress of a batch of print jobs according to an embodiment of the present invention.

Operation: The operation of various embodiments of the present invention will now be described with reference to FIGS. 11-14. FIGS. 11 and 12 are exemplary flow diagrams illustrating steps take to perform various implementations of the present invention. FIG. 13 illustrates an exemplary status table used to monitor and update the status of a series of print jobs while FIG. 14 illustrates an exemplary user interface enabling a user to monitor the status of those print jobs.

Starting with FIG. 11, steps taken to produce an image with a corresponding enhanced eye-mark are described. Image production instructions directing the production of an image are received (step 94). Image production instructions can, for example, be printing instructions or a portion of printing instructions issued by a source such as application 76 (FIG. 6) or web service 92 (FIG. 8). It is noted that printing instructions can include a set of image production instructions—that is—instructions to produce a set of images. Image production instructions can be translated to a corresponding print job that can be understood and acted upon by an image forming device responsible for producing the image on print media. Referring back to FIG. 7, interface module 84 can perform step 94.

Enhanced eye-mark data is then generated (step 96). The generated enhanced eye-mark data is for an eye-mark having an instructive portion and a descriptive portion. As noted above, the instructive portion may encode finishing instructions. The descriptive portion may, in some manner, identify the image production instructions, and/or it may provide an explanation of the instructive portion. The descriptive portion may be in human readable and/or machine readable form. Referring back to FIG. 7, eye-mark module 86 can perform step 96.

An image forming device is then caused to form the image and the enhanced eye-mark on print media (step 98). Referring back to FIG. 7, translator module 88 can assist with this step. Where, for example, image production instructions are printing instructions received from application 76 (FIG. 6) or web service 92 (FIG. 8), translator module 88 converts the image production instructions, any selected or default finishing options, and the enhanced eye-mark data generated in step 96 into a print job. That print job can be said to "correspond" to the image production instructions. Referring to FIGS. 6 and 7, translator module 88 can then send the print job onto queue 80 and queue manager 82 can release the job to production line 64 where an image forming device can form the image and the enhanced eye-mark on print media.

Moving to FIG. 12, steps taken to update the status of a set of queued print jobs are described. As discussed above, a print job includes instructions to form one or more images and one or more enhanced eye-marks on print media. The print job also includes finishing instructions encoded in the instructive portion of the enhanced eye-mark. A descriptive portion of the enhanced eye-mark encodes data identifying the print job. Print jobs are received into a queue (step 100). Referring back to FIG. 6, this can be accomplished as queue manager 82 receives print jobs from driver 78 placing those print jobs in queue 80.

At this point, the process splits into a production thread represented by steps 102-112 and an update thread represented by steps 114 and 116. Starting with the production thread, a print job is released from the queue (step 102). Following the instructions of the print job, an image forming device forms an image and a corresponding enhanced eye-mark on print media (step 104). As the print media is fed through a finishing device, a scanner in the finishing device reads the enhanced eye-mark and decodes its instructive and descriptive portions (step 106).

Following the finishing instructions, the finishing device attempts a finishing operation on the print media (step 108) and sends a progress update (step 110). A progress update is data reflecting the success or failure of the attempted finishing operation as well as data encoded by the descriptive portion of the enhanced eye-mark. It is then determined whether the queue is empty (step 112). If not, the process repeats with step 102.

Moving to the update thread, once print jobs are received into the queue in step 100, the process waits for receipt of a progress update (Step 112). Upon receipt, the progress update is processed (Step 116). Processing a progress update, for example, can include alerting a user to the success or failure of a finishing operation, the operational status of a finishing device, as well as the successful completion of a print job. A print job can be said to be complete once all of its instructions have been successfully carried out—that is—once all images and enhanced eye-marks have been formed on print media and all finishing instructions encoded by the enhanced eye-marks have been carried out.

Queue manager 82 (FIG. 6) can be responsible for performing step 116. FIGS. 13 and 14 help to illustrate how. Referring first back to FIG. 5, imagine that production client 60 has sent "M" print jobs to production server 62. Each print job includes instructions for image forming device 66 to print a set of images and corresponding enhanced eye-marks. Each enhanced eye-mark encodes finishing instructions directing the operation of one or more of finishers 68-72.

FIG. 13 illustrates a status table 118 maintained by queue manager 82 (FIG. 6). Status table 118 represents a collection of data representing the status of a set of print jobs. Each print job is represented by an entry 120. Each entry 120 includes data in a series of fields 122-130. Job ID field 122 contains data identifying a particular print job. It is noted that the data in job ID field 122 can be encoded or otherwise referenced by the descriptive portion of an enhanced eye-mark. Printer field 124 contains data identifying the progress of image forming device 66 (FIG. 5) has made in forming images and corresponding eye-marks for a given print job. Finisher fields 126-130 each contain data identifying the progress that a given finisher 68-72 (FIG. 5) has made in performing finishing operations as directed by the enhanced eye-marks for that print job.

With reference again to FIGS. 5 and 6, as image forming device 66 processes print jobs, it sends progress updates to queue manager 82. Queue manager 82 reflects, each of those updates in the printer update field 124 of a corresponding entry 120. As a given finisher reads a particular enhanced eye-mark and performs a finishing operation as instructed, the finisher sends a progress update to queue manager 82. Queue manager 82 reflects those updates in finisher update fields 126-130.

FIG. 14 illustrates an exemplary print job status user interface 132 created according to status table 118. User interface 132 provides a mechanism for alerting a user as to the production status of print jobs. Like status table 118, user interface 132 includes a series of entries 134 each associated with a particular print job. Each entry 134 includes data in a series of fields 136-144. Data contained in fields 136-144 is presented in a user readable format. Job ID field 136 contains data identifying a particular print job. Printer field 138 contains data identifying the progress of a particular print job with regard to image forming device 66.

Printer field 138 for Job (1) contains "COMPLETE 5 of 5." Where, for example, the particular print job instructed five images to be printed on a web or five copies of a document to be printed, this data indicates that all five images or five copies have been printed successfully. The data in finisher fields 140 and 142 for Job (1) also indicate that finishers (one) and (two) have successfully performed all finishing operations related to that print job. Data in finisher field 144 indicates that finisher (n) is currently processing Job (1).

Printer entry 138 for Job (2) contains "COMPLETE 7 of 7" indicating that Job (2) has been printed successfully. However, finisher field 140 indicates "ERROR 6 of 7" meaning that finisher (one) has successfully performed six out of seven finishing operations with respect to Job (2), and that an error or malfunction is preventing it from continuing. Finisher field 142 indicates that finisher (two) is currently processing Job (2). Data in finisher field 144 indicates that finisher (n) is waiting and has yet to perform a finishing operation with respect to Job (2)

Printer entry 138 for Job (M) contains "PROGRESS 1 of 10" meaning that Job (M) is currently being printed. Data in finisher fields 140-144 indicate that finishers (one) through (n) are each waiting and have yet to perform a finishing operation with respect to Job (M).

CONCLUSION: The illustrations of FIGS. 2-4 illustrate three exemplary versions of an enhanced eye-mark. Implementation of the present invention, however, is not limited to the versions shown. An enhanced eye-mark need only have an instructive portion and a descriptive portion. Moreover, FIGS. 2-4 show the descriptive portion and the instructive portion of the enhanced eye-marks to be visually separate. This need not be the case. FIGS. 2-4 also each show an enhanced eye-mark corresponding to a particular image. It is noted that an enhanced eye-mark may correspond to or otherwise be associated with a set of images. In other words, a single enhanced eye-mark printed on one page of a multiple page document may correspond to images on each page of that document. For example, the instructive portion of the enhanced eye-mark may encode binding instructions for all pages while the descriptive portion identifies the document.

The diagrams of FIGS. 6-10 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 11 and 12 show specific orders of execution, the orders of execution may differ from that which are depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An image production method, comprising:

receiving image production instructions directing the production of an image, the image production instructions corresponding to a print job;

generating enhanced eye-mark data for an enhanced eye-mark having a first portion, a second portion, and a third portion, the first portion encoding a finishing instruction, the second portion providing a textual description of one of the finishing instruction and the print job, the third portion encoding data identifying the print job;

causing an image forming device to form the image and the enhanced eye-mark on print media;

electronically reading the first portion and the third portion of the enhanced eye-mark formed on the print media;

decoding the first portion to identify the finishing instruction and the third portion to identify the print job;

directing a performance of a finishing operation on the print media according to the finishing instruction; and updating status data for the print job identified by decoding the third portion according to the performance of the finishing operation, the updated status data identifying a current status of the print job that includes an indication of the performance of the finishing operation.

2. The method of claim 1, wherein the second portion provides a textual descriptions of the finishing instruction and the print job.

3. The method of claim 1, further comprising electronically reading the first portion of the enhanced eye-mark formed on the print media and directing a performance of a finishing operation on the print media according to the finishing instruction encoded by the first portion.

4. The method of claim 1, wherein the second portion textually identifies a characteristic of the image production instructions.

5. The method of claim 4, wherein the second portion identifies a characteristic of the image production instructions by identifying the image.

6. The method of claim 4, wherein second descriptive portion identifies a characteristic of the image production instructions by identifying the print job.

7. A computer readable medium storing a computer program, the computer program having instructions that when executed by a computing device cause a method to be performed, the method comprising:

receiving image production instructions directing the production of an image, the image production instructions corresponding to a print job;

generating enhanced eye-mark data for enhanced eye-mark, the enhanced eye-mark having a first portion, a second portion, and a third portion, the first portion encoding a finishing instruction, the second portion providing a textual description of one of the finishing instruction and the print job, the third portion encoding data identifying the print job;

causing an image forming device to form the image and the enhanced eye-mark on print media;

electronically reading the first portion and the third portion of the enhanced eye-mark formed on the print media, decoding the first portion to identify the finishing instruction and the third portion to identify the print job;

directing a performance of a finishing operation on the print media according to the finishing instruction; and updating status data for the print job identified by decoding the third portion according to the performance of the finishing operation, the updated status data identifying a current status of the print job that includes an indication of the performance of the finishing operation.

8. The medium of claim 7, wherein the descriptive portion provides a textual description of the finishing instruction.

9. The medium of claim 7, wherein the method further comprises electronically reading the first portion of the enhanced eye-mark and directing a performance of a finishing operation on the print media according to a finishing instruction encoded by the first portion.

10. The medium of claim 7, wherein the second portion identifies a characteristic of the image production instructions.

11. The medium of claim 10, wherein the second portion identifies a characteristic of the image production instructions by identifying the image.

12. The medium of claim 10, wherein the second portion identifies a characteristic of the image production instructions by identifying the print job.

13. An image production system, comprising:

a means for receiving image production instructions directing the production of an image, the image production instructions corresponding to a print job;

a means for generating enhanced eye-mark data for an enhanced eye-mark having a first portion, a second portion, and a third portion, the first portion encoding a finishing instruction, the second portion providing a textual description of one of the finishing instruction and the print job, the third portion encoding data identifying the print job;

a means for, at least indirectly, causing an image forming device to form the image and the enhanced eye-mark on print media;

a means for electronically reading the first portion and the third portion of the enhanced eye-mark formed on the print media;

a means for decoding the first portion to identify the finishing instruction and the third portion to identify the print job;

a means for directing a performance of a finishing operation on the print media according to the finishing instruction; and a means for updating status data for the print job identified by decoding the third portion according to the performance of the finishing operation, the updated status data identifying a current status of the print job that includes an indication of the performance of the finishing operation.

14. The system of claim 13, wherein the second portion provides a textual descriptions of the finishing instruction and the print job.

15. The system of claim 13, further comprising a means for electronically reading the first portion of the enhanced eye-mark formed on the print media and directing a performance of a finishing operation on the print media according to the finishing instruction encoded by the first portion.

16. The system of claim 13, wherein the second portion textually identifies a characteristic of the image production instructions.

17. The system of claim 16, wherein the second portion identifies a characteristic of the image production instructions by identifying the image.

18. The system of claim 16, wherein second descriptive portion identifies a characteristic of the image production instructions by identifying the print job.

* * * * *